United States Patent Office 3,446,744
Patented May 27, 1969

3,446,744
LOW MELTING $KO_2$-$NaO_2$ EUTECTIC COMPOSITIONS
Frederick Tepper, Butler, Pa., assignor to Mine Safety Appliances Company, Pittsburgh, Pa., a corporation of Pennsylvania
No Drawing. Filed Jan. 16, 1967, Ser. No. 609,328
Int. Cl. C01b *15/00;* C09k *3/00;* C01d *1/00*
U.S. Cl. 252—186　　　　　　　　　　　　3 Claims

ABSTRACT OF THE DISCLOSURE

New superoxide compositions melting below 700° F. contain between about 30 and 55 mol percent sodium superoxide, the remainder being potassium superoxide, including a eutectic composition melting at 610° F. containing 50 mol percent sodium superoxide, are prepared by heating potassium superoxide and sodium peroxide under oxygen pressure.

---

This invention relates to low melting compositions of sodium superoxide, $NaO_2$, and potassium superoxide, $KO_2$, and to methods of preparing them.

In systems wherein superoxides are reacted with water to produce oxygen, it is desirable to obtain high oxygen production on both a weight and volume basis. Thus it is desirable to obtain compositions of high density containing a high proportion of sodium superoxide. Also, complex shapes are needed for some applications to adjust and control the rate of oxygen production during the period of reaction. The objective of obtaining high density and complex shapes would be best accomplished by casting, but it is impractical to melt sodium superoxide. Although the melting point of sodium superoxide has not been precisely defined, it is in excess of 1000° F. under an oxygen pressure of 2000 p.s.i.g. At such high temperatures, the superoxides are extremely corrosive and the cost of replacing containers is prohibitive. Potassium superoxide melts at about 820° F. but its oxygen content on a weight basis is much lower than that of sodium superoxide.

It is therefore an object of this invention to provide low melting compositions of potassium superoxide and sodium superoxide containing a substantial proportion of sodium superoxide. Another oxide is to provide a method of preparing such low melting compositions. Other objects will be apparent from the following description and claims.

The compositions of this invention melt below about 700° F. and contain between about 30 annd 55 mol percent sodium superoxide, the remainder being potassium superoxide. A eutectic composition containing about 50 mol percent potassium superoxide and 50 mol percent sodium superoxide melts at about 610° F.

The compositions can be formed by heating a mixture of sodium and potassium superoxide to melting in an autoclave under an oxygen pressure sufficient to prevent decomposition, suitable 1500 p.s.i.g. In the preferred method of preparing the compositions, potassium superoxide and sodium peroxide are heated to a temperature of about 820 to 900° F. under an oxygen pressure of at least about 1500 p.s.i.g. Under these conditions, the sodium peroxide is converted to sodium superoxide.

To illustrate this invention, 564 grams of $KO_2$ and 436 grams of $NaO_2$ were mixed, charged to a nickel retort in an autoclave and melted at 900° F. under an oxygen pressure of 1500 p.s.i.g. The product was a eutectic melting at 610° F. and was shown by X-ray and chemical analysis to contain only superoxides; no decomposition to lower oxides occurred during melting. With slow cooling the eutectic consists of tetragonal $KO_2$ and face centered cubic $NaO_2$. Lattice parameters are slightly shifted indicating some small degree of solubility of one constituent in the other. $KO_2$ exhibits allotropic transformation from a high temperature. less dense, cubic form to a low temperature tetragolan form at a temperature of about 175° F. When the $NaO_2$-$KO_2$ compositions are cooled rapidly through the transformation temperature, however, the cubic form of $KO_2$ is retained to room temperature. The $NaO_2$ apparently has a stabilizing effect on the cubic form of $KO_2$. The eutectic composition with $KO_2$ in the tetragonal form has a density of 2.34 g./cc., the highest density of any composition in the $NaO_2$-$KO_2$ system. With $KO_2$ in the cubic form, which is an expanded lattice over the tetragonal form, the entectic density is about 2.20 g./cc. Tetragonal $KO_2$ has a density of 2.15 g./cc. and $NaO_2$ has a density of 2.19 g./cc.

Other compositions of $NaO_2$ and $KO_2$ containing between about 30 and 55% $NaO_2$ melt below 700° F. and on cooling give solid phases of $KO_2$ and eutectic or $NaO_2$ and eutectic.

Illustrative of a preferred method of preparing the low melting compositions, 350 g. of $Na_2O_2$ and 640 g. of $KO_2$ were mixed, charged to a nickel retort in an autoclave and heated to 850° F. under an oxygen pressure of 1500 p.s.i.g. for three hours. The product recovered, after cooling to room temperature, was $NaO_2$-$KO_2$ eutectic that contained no peroxide as determined by X-ray and chemical analysis. 1135 grams of product were recovered; the 145 gram increase in weight corresponds to the theoretical weight of oxygen required to convert the $Na_2O_2$ to $NaO_2$.

I claim:
1. A eutectic composition melting below about 700° F. consisting essentially of $KO_2$ and $NaO_2$ and containing between about 30 and 55 mol percent $NaO_2$.
2. A eutectic composition according to claim 1 melting at about 610. F. containing 50 mol percent $NaO_2$.
3. A composition according to claim 2 in which the $KO_2$ is in the tetragonal form.

References Cited

UNITED STATES PATENTS 2,648,596　8/1953　Schecter _____ 23—184

LEON D. ROSDOL, *Primary Examiner.*

I. GLUCK, *Assistant Examiner.*

U.S. Cl. X.R.

23—184, 302; 252—192